(12) United States Patent
Olofsson et al.

(10) Patent No.: US 9,392,220 B2
(45) Date of Patent: Jul. 12, 2016

(54) DEVICE AND METHOD FOR SYNCHRONIZING RECEIVED AUDIO DATA WITH VIDEO DATA

(75) Inventors: Håkan Olofsson, Stockholm (SE); Arto Juhani Mahkonen, Helsinki (FI); Fredrik Gustav Åberg, Kyrkslatt (FI)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 852 days.

(21) Appl. No.: 13/133,243

(22) PCT Filed: Dec. 8, 2008

(86) PCT No.: PCT/SE2008/051420
§ 371 (c)(1),
(2), (4) Date: Aug. 9, 2011

(87) PCT Pub. No.: WO2010/068151
PCT Pub. Date: Jun. 17, 2010

(65) Prior Publication Data
US 2012/0169837 A1   Jul. 5, 2012

(51) Int. Cl.
*H04N 7/14* (2006.01)
*H04N 21/2368* (2011.01)
(Continued)

(52) U.S. Cl.
CPC ........... *H04N 7/147* (2013.01); *H04N 21/2368* (2013.01); *H04N 21/41407* (2013.01); *H04N 21/4307* (2013.01); *H04N 21/4341* (2013.01); *H04N 21/4788* (2013.01)

(58) Field of Classification Search
CPC ......... H04N 7/147; H04N 7/15; H04N 7/152; H04N 7/155; H04N 7/157; H04N 21/2368; H04N 21/4307; H04N 21/4341; H04N 21/242; H04N 21/4788

USPC .......... 348/14.01, 14.02, 14.08, 14.12, 14.13, 348/14.07, 14.09, 516, 500, 518, 521, 513, 348/526
See application file for complete search history.

(56) References Cited

U.S. PATENT DOCUMENTS 5,608,839 A * 3/1997 Chen ............................ 704/235
5,818,514 A  10/1998 Duttweiler et al.
(Continued)

FOREIGN PATENT DOCUMENTS

EP   0689362 A2   12/1995
EP   1773072 A1   4/2007
(Continued)

OTHER PUBLICATIONS

JP Office Action from corresponding application JP 2011-539473 mailed Jan. 25, 2013, 2 pages.
(Continued)

*Primary Examiner* — Davetta W Goins
*Assistant Examiner* — Jasmine Pritchard
(74) *Attorney, Agent, or Firm* — Patent Portfolio Builders, PLLC

(57) ABSTRACT

A communication device (12), computer readable medium and method for synchronizing video data with audio data received by a communication device, the video data including a plurality of segments of video data and the audio data including a plurality of segments of audio data. The method includes receiving a first segment of audio data at the communication device (12); receiving a first segment of video data at the communication device, at the same time or later in time than the first segment of audio data, the first segment of video data being logically related to the first segment of audio data; and applying a synchronization mechanism between the first segment of audio data and the first segment of video data based on a predetermined indicator.

23 Claims, 13 Drawing Sheets

(51) Int. Cl.
*H04N 21/414* (2011.01)
*H04N 21/43* (2011.01)
*H04N 21/434* (2011.01)
*H04N 21/4788* (2011.01)

(56) References Cited

U.S. PATENT DOCUMENTS

| | | | | |
|---|---|---|---|---|
| 5,953,049 | A * | 9/1999 | Horn et al. | 348/14.09 |
| 6,359,656 | B1 * | 3/2002 | Huckins | 348/512 |
| 7,764,633 | B2 * | 7/2010 | Marque-Pucheu | H04W 4/10 370/261 |
| 8,437,791 | B2 * | 5/2013 | Park | H04W 4/10 455/518 |
| 8,558,952 | B2 * | 10/2013 | Ishikawa | 348/515 |
| 8,558,953 | B2 * | 10/2013 | Black | 348/515 |
| 8,576,922 | B2 * | 11/2013 | Moss et al. | 375/240.28 |
| 2004/0100582 | A1 * | 5/2004 | Stanger | 348/515 |
| 2005/0237378 | A1 | 10/2005 | Rodman | |
| 2005/0259694 | A1 * | 11/2005 | Garudadri et al. | 370/503 |
| 2005/0276282 | A1 * | 12/2005 | Wells et al. | 370/503 |
| 2006/0072627 | A1 * | 4/2006 | Kugumiya et al. | 370/503 |
| 2008/0273116 | A1 * | 11/2008 | Gentric | 348/515 |
| 2013/0063660 | A1 * | 3/2013 | Sullivan | 348/521 |
| 2013/0128115 | A1 * | 5/2013 | Oostveen et al. | 348/515 |
| 2014/0096167 | A1 * | 4/2014 | Lang | H04N 21/4788 725/91 |
| 2016/0080694 | A1 * | 3/2016 | Harris | H04N 7/147 348/14.08 |

FOREIGN PATENT DOCUMENTS

| | | |
|---|---|---|
| JP | H04-137987 A | 5/1992 |
| JP | 2009-508386 A | 2/2009 |
| WO | 03039087 A1 | 5/2003 |
| WO | 2007031918 A2 | 3/2007 |

OTHER PUBLICATIONS

Extended European Search Report issued in European Patent Application No. 08878786.6, 13 pages (Mar. 12, 2014).
Office Action in EP application No. 08878786.6 mailed Feb. 4, 2015.
Office Action in JP application No. 2011-539473 mailed May 31, 2013, English Translation Submitted.

* cited by examiner

DEVICE AND METHOD FOR SYNCHRONIZING RECEIVED AUDIO DATA WITH VIDEO DATA

CROSS-REFERENCE TO RELATED APPLICATION

This application is a 35 U.S.C §371 National Phase Entry Application from PCT/SE2008/051420, filed Dec. 8, 2008, and designating the United States.

TECHNICAL FIELD

The present invention generally relates to methods, devices and systems capable of processing audio and video data and, more particularly, to techniques and methods for compensating for a time delay associated with reproducing video data transmitted with audio data.

BACKGROUND

A communication, which includes both video data and associated audio data, using multiple media is becoming increasingly important in the communications industry, both for fixed and mobile access. The traditional speech telephony is more and more often being upgraded to include a video component (i.e., video data), resulting in the opportunity for users to communicate using so-called "video telephony."

The video data associated with a video telephony call is typically created by a video camera in the sending device. The sending device may be a portable device, such as a mobile phone. Sometimes the user orients the sending device so that the camera is positioned to show the speaker's face. However, the camera may be used to show other things, which the user finds relevant for the conversation, for example a view that the user wants to share with the person that she or he is talking to. Thus, what is shown during a communication session can change. In this context, the video data and the audio data are usually generated having a logical connection, e.g., a speech of a user is associated with a video of the face of the user that corresponds to the user generating the speech.

When the speaking user is also shown on the listening user's screen, it is desirable that the audio and video data are synchronized so that the user experiences a good coordination between the sound and the video. The lip movements of the user shall normally be in synch with the sound from the device's speakerphone to achieve the good coordination. This provides a connection between the lip movements and the heard words, as it would be in a normal discussion between two people at short distance. This is referred to herein as lip-sync or logically related audio and video data.

Hence, in the existing services, such as 3 G circuit-switched video telephony (see for example 3GPPTS26.111, which is incorporated by reference herein, from 3GPP standard group, ETSI Mobile Competence Centre 650, route des Lucioles 06921 Sophia-Antipolis Cedex, France) and emerging IP multimedia services such as IMS Multimedia Telephony (see for example 3GPP TS 22.173 and ETSI TS181002 from ETSI) the support of inter-media synchronization is desired. The traditional methods to achieve synchronization between audio and video are discussed next. For Circuit Switched Multimedia, there can be provided an indication of how much the audio shall be delayed in order to be synchronized with the video (see ITU-T H.324). For services that are transported on Real-time Transport Protocol (RTP, see IETF RFC3550), RTP timestamps together with RTP Control Protocol (RTCP) sender reports can be used as input to achieve the synchronization (see IETF RFC3550). However, some existing multimedia communication services do not provide any media synchronization, resulting in a poor user experience when lip-synchronization is needed.

The systems that are synchronizing the audio with the video typically delay the audio data by a certain amount of time until the video data is decoded, and then both data are played simultaneously to achieve the desired lip-synchronization. However, this synchronizing method is unpleasant for users due to the increased delay causing long response times and problems for the conversation. For example, the video data typically has a longer delay from the camera to the screen than the speech has from the microphone to the speakerphone. The longer delay for video data is caused by longer algorithmic delay for encoding and decoding, often a slower frame rate (compared to audio data), and in some cases also by longer transfer delay due to the higher bit rate. Assuming that the receiving device synchronizes audio and video, the device has to delay the audio data flow before playing it out. This naturally causes a reduced user experience of the speech, which in turn hampers the conversational quality. For example, when the delay of the audio data exceeds a certain limit (about 200 ms), it starts to impact the conversational quality. First, there may be some annoyance of the user because, the other speaker seems to react slowly, and sometimes both speakers start to talk simultaneously (because they will notice this problem only after some time delay). If the delay is large (e.g., over 500 ms), it starts to be difficult to keep up a normal conversation. Thus, one cause of the dissatisfaction of the speakers using video telephony is that the response time of the other speaker is too long, unlike in a normal face-to-face or speech telephony conversation.

Accordingly, it would be desirable to provide devices, systems and methods for audio and video communications that avoid the afore-described problems and drawbacks.

SUMMARY

According to an exemplary embodiment, there is a method for synchronizing video data with audio data received by a communication device, the video data including a plurality of segments of video data and the audio data including a plurality of segments of audio data. The method includes receiving a first segment of audio data at the communication device; receiving a first segment of video data at the communication device, at the same time or later in time than the first segment of audio data, the first segment of video data being logically related to the first segment of audio data; and applying a synchronization mechanism between the first segment of audio data and the first segment of video data based on a predetermined indicator.

According to another exemplary embodiment, there is a communication device for synchronizing received video data with received audio data, the video data including a plurality of segments of video data and the audio data including a plurality of segments of audio data. The communication device includes an input/output unit configured to receive a first segment of audio data and to receive a first segment of video data, at the same time or later in time than the first segment of audio data, the first segment of video data being logically related to the first segment of audio data; and a processor configured to apply a synchronization mechanism between the first segment of audio data and the first segment of video data based on a predetermined indicator.

BRIEF DESCRIPTION OF THE DRAWINGS

The accompanying drawings, which are incorporated in and constitute a part of the specification, illustrate one or more embodiments and, together with the description, explain these embodiments. In the drawings.

LIST OF ABBREVIATIONS

RTP—Real-Time Transport Protocol;
RTCP—Real-Time Control Protocol;
AVS—Audio-video signal;
LED—Light Emitting Diode;
UDP—User Datagram Protocol;
IP—Internet Protocol;
AMR—Adaptive Multi-Rate;
DVD—Digital Versatile Disc;
ASIC—Application Specific Integrated Circuit;
DSP—Digital Signal Processor;
FPGA—Field Programmable Gate Array;
IC—Integrated Circuit;
FM—Frequency Modulated;
LCD—Liquid Crystal Display;
OLED—Organic Light-Emitting Diode; and
WLAN—Wireless Local Area Network.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a user that uses a mobile phone to communicate with another user that also uses a mobile phone. However, the embodiments to be discussed next are not limited to this system but may be applied to other existing audio and video transmission systems.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

Figure 1:
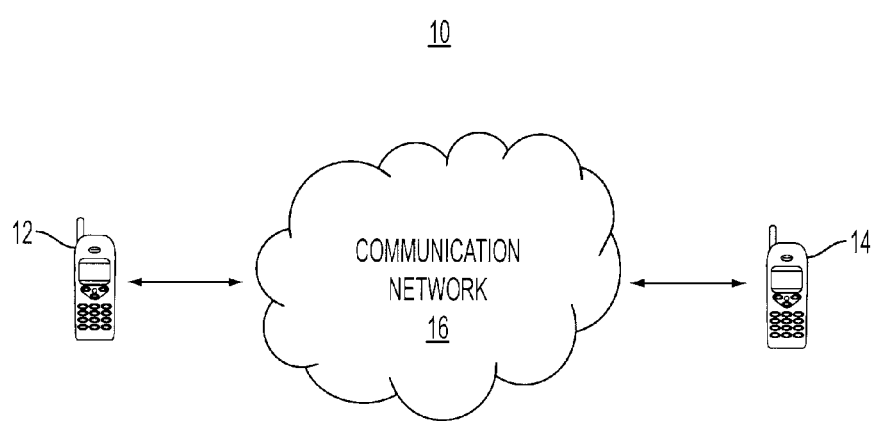
FIG. 1 is a schematic diagram of a communication system including a sending device, a receiving device and a communication network according to an exemplary embodiment.

As shown in FIG. 1, according to an exemplary embodiment, a general system 10 includes first 12 and second 14 communication devices connected via a communication network 16 to each other. The devices 12 and 14 may be a desktop, a laptop, a mobile phone, a traditional phone, a personal digital assistant, a digital camera, a video camera, etc. The two devices may be connected to each other via a wireline or a wireless interface. The two devices may be directly connected to each other or via one or more base stations (not shown) that are part of the communication network. The term "base station" is used herein as a generic term for any device that facilitates an exchange of data between connecting devices, as for example, a modem, a station in a telecommunication system, a whole network etc.

Figure 2:
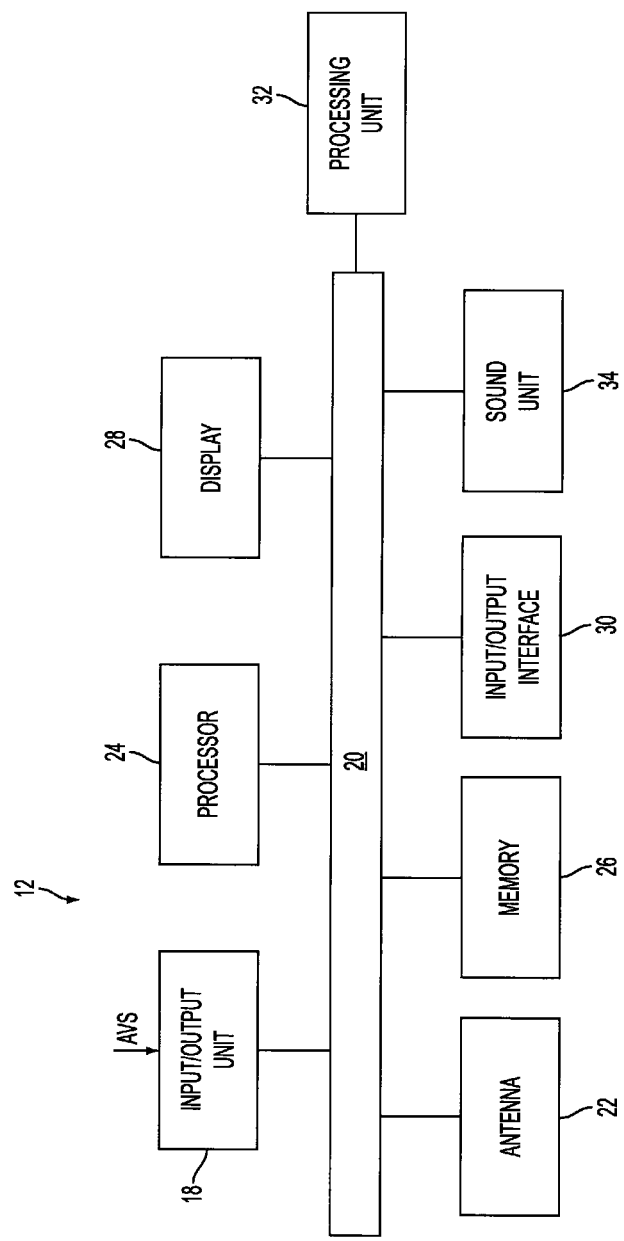
FIG. 2 is a schematic diagram of the sending or receiving device according to an exemplary embodiment.

As shown in FIG. 2, a structure of the device 12 or 14 includes an input/output port 18 that is configured to receive/transmit an audio-video signal AVS. The audio-video signal AVS may include audio data and video data. Each of the audio or video data may include a plurality of segments. A segment may include a number of frames that correspond to a certain time. However, this definition of the segment may be further qualified depending on the specific environment. Examples are provided later for specific embodiments. The plurality of segments of audio and/or video data may include a first segment, a last segment and also may include other segments between the first and last segments. A segment of audio data may correspond to a segment of video data, e.g., a user that records an audio message while video recording his face. The input/output port 18 may be connected via a bus 20 to an antenna 22 or to a wireline (not shown) to receive the video signal AVS. The antenna 22 may be a single antenna or a multiple antenna and may be configured to receive the audio-video signal AVS via an infrared, radio frequency or other known wireless interfaces. The input/output port 18 is also connected to a processor 24 that receives the audio-video signal AVS for processing. The processor 24 may be connected via the bus 20 to a memory 26. The memory 26 may store the audio-video signal AVS and other data necessary for the processor 24. In an exemplary embodiment, the device 12 may have a display 28 configured to display an image corresponding to the received audio-video signal AVS. The display 28 may be a screen and may also include one or more LED or any other known source emitting device. The display 28 may be a combination of the screen and the LED. The device 12 may have in another exemplary embodiment an input/output interface 30, e.g., a keyboard, a mouse, a microphone, a video camera, etc., which is capable of inputting commands and/or data from a user. The device 12 may have a processing unit 32, connected to the bus 20, which is capable of measuring various indicators of the received audio-video signal AVS, or capable of analyzing the video data of the AVS to extract a face of a user, or capable of reproducing the audio data of the AVS at a different speed (higher or lower than the recording speed). The device 12 may have a sound unit 34 configured to produce a sound based on audio data received by the device. Also, the sound unit 34 may emit a sound as instructed by the processor 24 or may record a sound. In one exemplary embodiment, the sound unit 30 may include a speakerphone and a microphone. The device 14 shown in FIG. 1 may have the same structure as the device 12 shown in FIG. 2.

Figure 3:
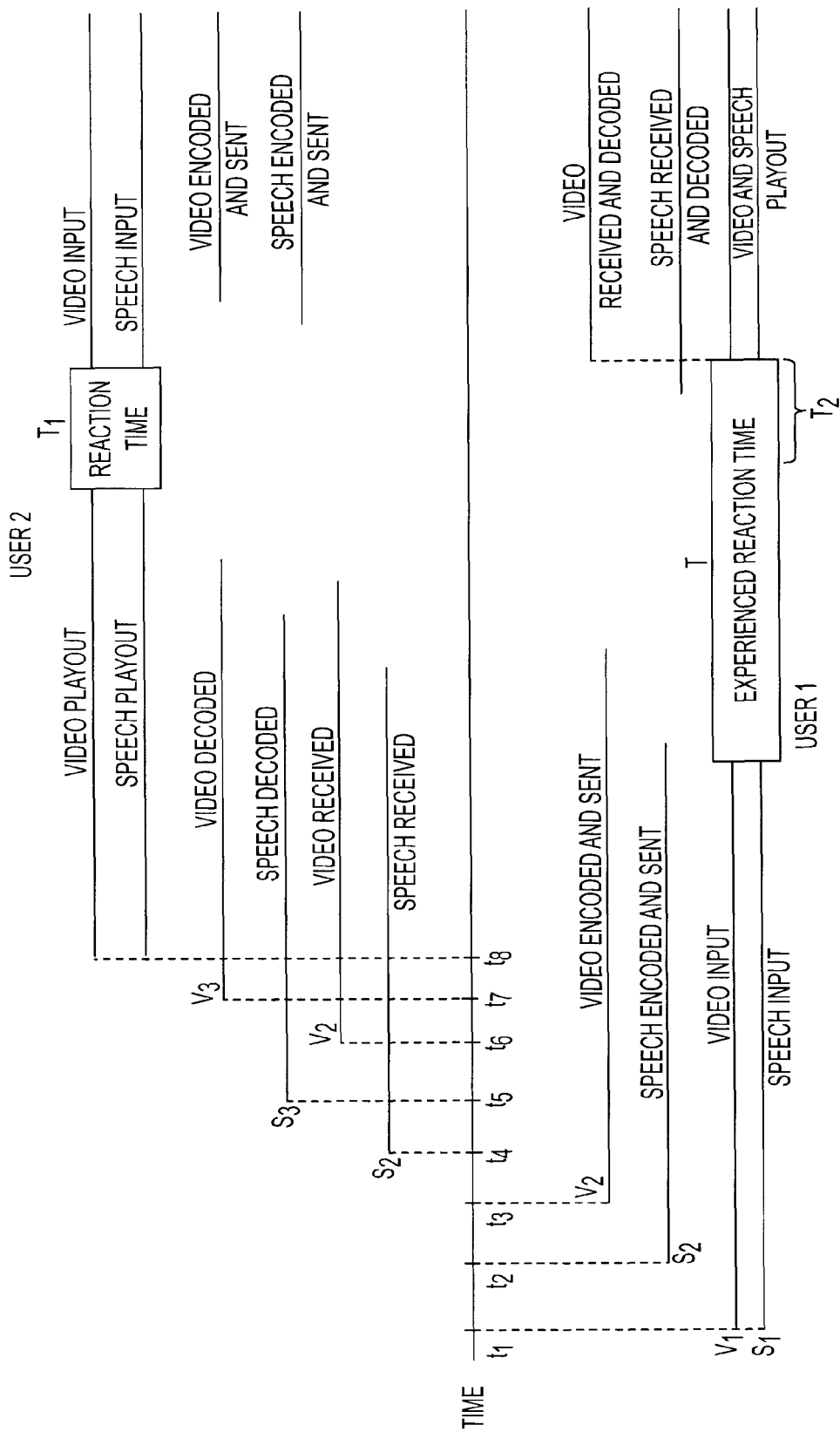
FIG. 3 is a schematic diagram showing the timing of audio and video data exchanged between the sending device and the receiving device.

In the following, for simplicity, the device 12 (see FIG. 1) is considered to be the sender and the device 14 (also see FIG. 1) is considered to be the receiver. However, both devices 12 and 14 may act as a sender and/or as a receiver. When a user 1 of the device 12 transmits video and audio data to a user 2 of the device 14, the actions, as shown in FIG. 3, are taking place initially in the device 12 and then in the device 14. More specifically, the device 12 receives audio data S1 from user 1 or another source and also video data V1 from the user 1 or another source at a time t1. Both the audio data S1 and the video data V1 are encoded by device 12 and then sent via the input/output unit 18 or the antenna 22 to the user 2. The encoded audio data S2 is sent at a time t2, later than t1 but earlier than a time t3 when the encoded video data V2 is sent. FIG. 3 shows that already the video data is delayed by t3-t2 from the audio data. This delay in sending the encoded video data V2 is due to the longer encoding process required by the video data. The encoded audio data S2 is received at a time t4 and the encoded video data V2 is received at a later time t6 by the device 14 of the user 2. Because of the delay of the encoded video data V2, it may happen that the receiving device 14 starts to decode the encoded audio data S2 at a time t5, later than the time t4 but prior to the time t6, when the encoded video data V2 is received by the device 14. However, in one exemplary embodiment, the time t5 may be later than time t6. The device 14 also decodes the encoded video data V2 at a time t7, later than the time t6.

The earliest the device 14 can play both the decoded video data V3 and the decoded audio data S3 in a synchronized manner is at time t8. Thus, in traditional devices, the device 14 delays the audio data from time t5 to time t8 and starts to play both the decoded audio data S3 and the decoded video data V3 at time t8. This delay between t5 and t8 creates the problems discussed in the Background section in the conventional devices. FIG. 3 also shows timings and encoded/decoded data when the user 2 replies to the user 1 and how a reaction time T1 of the user 2 is experienced by user 1 as an experienced reaction time T.

According to an exemplary embodiment, the receiving device of the receiving user may inform the receiving user that the sending user has stopped talking. By having this information, the receiving user may avoid starting to talk while his device is still processing the received data. In this regard, it is noted that in the conventional devices there is a delay between (i) the time the receiving device has received the last fragment of audio data from the sending user, and (ii) the time the receiving user becomes aware of this fact, due to the internal processing of the receiving device. However, according to this embodiment, this delay is reduced or eliminated. According to another exemplary embodiment, the receiving device may provide an indication to the user 2 that speech of the user 1 will stop shortly, so that the user 2 can start to talk sooner than otherwise, thus reducing the reaction time T1. The indication may be a visual signal (e.g., a turned on LED or a symbol on a screen of the device) that lasts as long as the speech is active. The signal may be other visual or audible signs.

Figure 4:
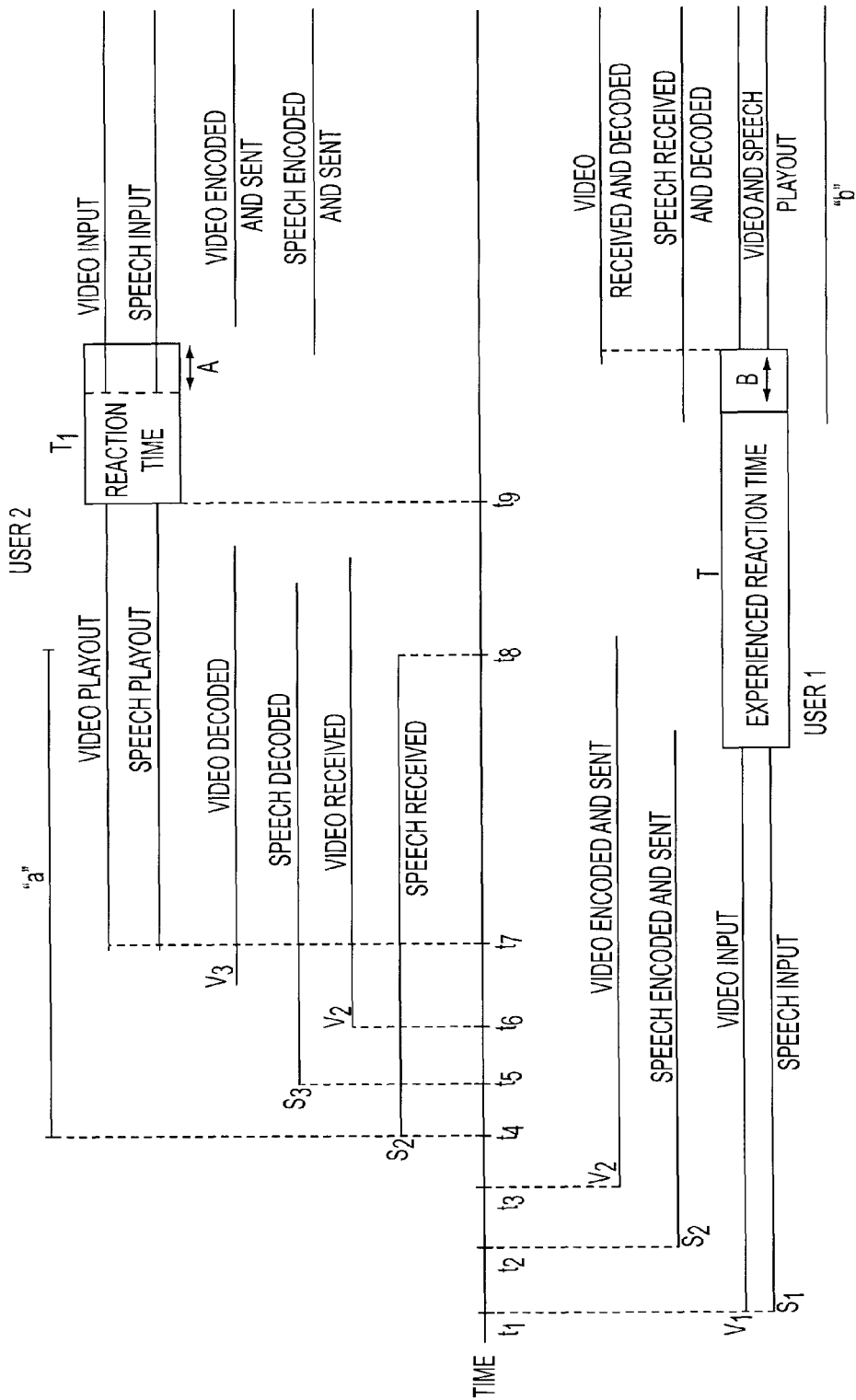
FIG. 4 is a schematic diagram showing the timing of audio and video data exchanged between the sending device and the receiving device using pre-notification according to an exemplary embodiment.

According to an exemplary embodiment shown in FIG. 4, a flow of video and audio data may include a speech pre-notification "a" to user 2. More specifically, user 2 may receive (generates) the pre-notification "a" that user 1 has stopped sending audio data. The pre-notification "a" may be generated at t4 or shortly thereafter and the receiving user becomes aware of the incoming audio data at t4 and not at t7 when the audio data is played out. This pre-notification reduces the reaction time T1 of user 2. The gain (i.e., the reduction in the time delay of the audio data) is shown in FIG. 4 as "A". In this regard, the timing and the symbols used in FIG. 4 are similar to those used in FIG. 3 and their explanation is not repeated herein.

According to another exemplary embodiment, the receiving device may generate a pre-notification informing the user 2 that audio data from user 1 is not detected. This pre-notification may be generated and displayed at t8, which is earlier than a time t9 when conventionally user 2 determines that no speech is coming from user 1. Thus, the time difference t9-t8 may be another gain of user 2. In this exemplary embodiment, an end of a last segment of audio data is determined and the pre-notification is generated based on the end of the last segment.

In another exemplary embodiment, there is an indication "b" generated in user is equipment when a start of audio data from user 2 is received) to user 1 that user 2 has started to send audio data. User 1 determines from the speech pre-notification "b" to avoid starting to talk again until the information from user 2 is presented synchronized with other media. The speech pre-notification "b" may be implemented similar to pre-notification "a." By using the speech pre-notification, the risk of both parties talking at the same time is thus substantially reduced and a reaction time of each party is also reduced.

In one exemplary embodiment, both the pre-notification "a" and "b" may be implemented in each of the communication devices 12 or 14. In this embodiment, the user is alerted by his/her own device that audio data from another user has started and is also alerted when that audio data has stopped prior to the audio data being played out.

The total gain (i.e., reduction in the time delay of the audio data) when both the pre-notifications "a" and "b" are used in this exemplary embodiment is an actual shortened round-trip delay due to user 2 being notified of the talk burst end, thus shortening his reaction time, combined with an additional reduced risk of cross talking due to user 1 being pre-notified of audio data coming from user 2. The total gain is shown as "B" in FIG. 4. Thus, according to the discussed exemplary embodiments, a device configured to generate speech pre-notification reduces the risk of cross talking (talking at the same time of users 1 and 2), and/or achieves a faster response of the user (because the user can better decide when it is his time to speak). Another advantage of one or all of the exemplary embodiments discussed above is the simplicity of implementation, because the device uses already available information in the terminal, i.e., no terminal-external signaling is required.

Figure 5:
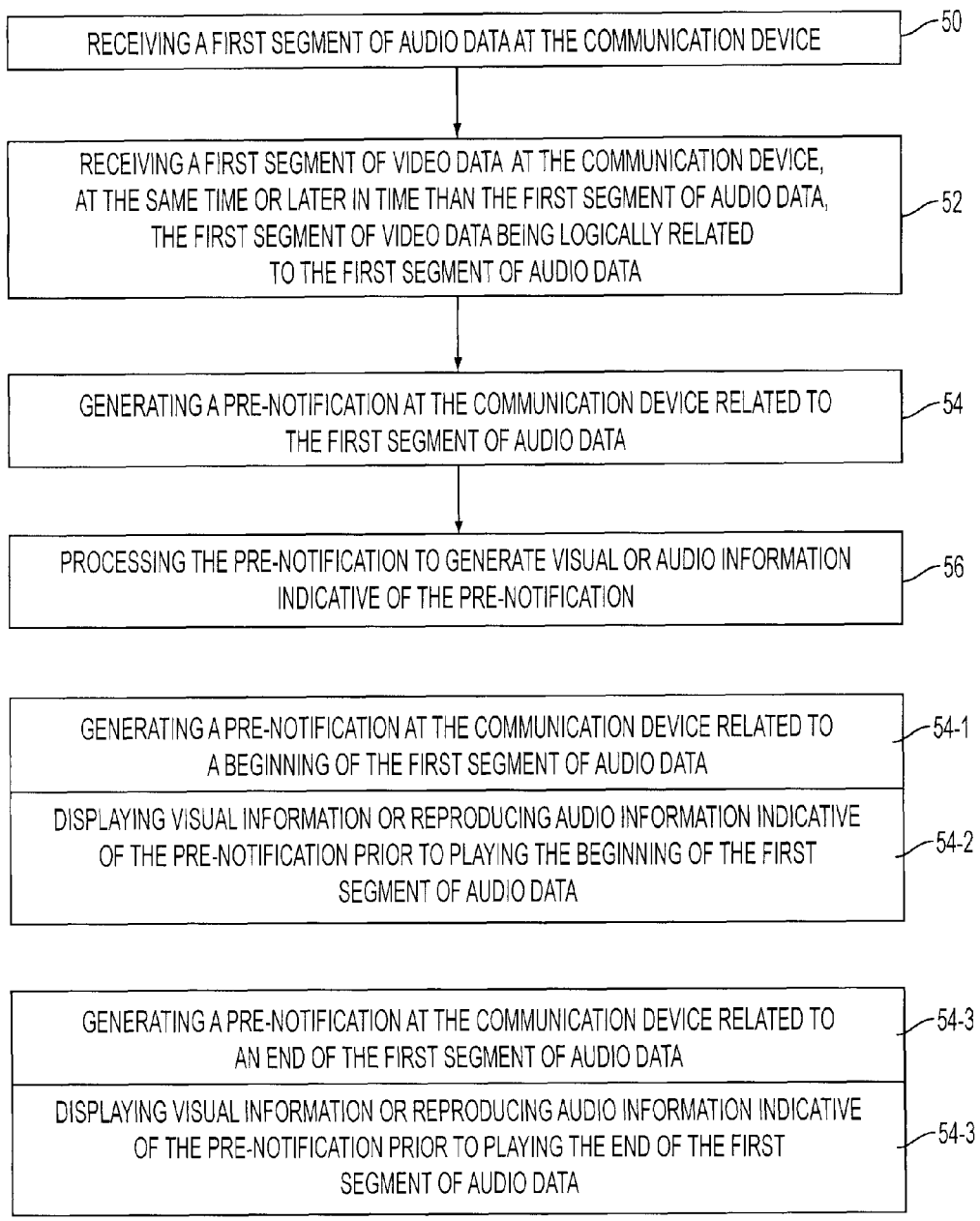
FIG. 5 is a flow chart indicating steps performed for transmitting the pre-notification according to an exemplary embodiment.

According to an exemplary method that implements the above discussed exemplary embodiments, FIG. 5 shows a method for synchronizing video data with audio data received by a communication device. The video data includes a plurality of segments of video data and the audio data includes a plurality of segments of audio data. The method includes a step 50 of receiving a first segment of audio data at the communication device, a step 52 of receiving a first segment of video data at the communication device, at the same time or later in time than the first segment of audio data, the first segment of video data being logically related to the first segment of audio data, a step 54 of generating a pre-notification at the communication device related to the first segment of audio data, and a step 56 of processing the pre-notification to generate visual or audio information indicative of the pre-notification.

In more details, step 54 may include a step 54-1 of generating a pre-notification at the communication device related to a beginning of the first segment of audio data, and a step 54-2 of displaying visual information or reproducing audio information indicative of the pre-notification prior to playing the beginning of the first segment of audio data. Alternatively, step 54 may include a step 54-3 of generating a pre-notification at the communication device related to an end of the first segment of audio data and a step 54-4 of displaying visual information or reproducing audio information indicative of the pre-notification prior to playing the end of the first segment of audio data. Still in another embodiment, step 54 may include all of steps 54-1 to 54-4.

According to further exemplary embodiments, the receiving device, instead of generating or receiving the pre-notification discussed above may include a picture analysis function (e.g., face detection function) that detects whether a face is present in the received video data. If the receiving device detects the face, the synchronization function may be turned on by the receiving device. If no face is detected by the receiving device, the synchronization function is not activated by the receiving device. Thus, a quality of a conversation that includes both audio and video is optimized. This exemplary technique is discussed next in more detail.

A communication between devices 12 and 14 may be set up using state-of-the-art session setup protocols. For simplicity, the exemplary embodiments referring to the technique including face analysis are discussed based on an RTP/User Datagram Protocol (UDP)/Internet Protocol (IP) communication system, using RTCP as the enabling synchronization protocol. However, the exemplary embodiments may be applied to other systems and protocols.

The receiving device is configured to apply the synchronization function if needed. The synchronization function may include the time delay of the audio data relative to the video data, novel techniques that are discussed in this disclosure, or a combination thereof. The synchronization function may be implemented in the processor 24 or in the processing unit 32 shown in FIG. 2. At least one of the communication devices 12 and 14 includes the synchronization function according to this exemplary embodiment. In another exemplary embodiment, both communication devices 12 and 14 have the synchronization function.

The communication device may be configured to initially have the synchronization function switched on or off. Throughout the communication, the sending device transmits audio and video data along with standard protocol tools to enable synchronization. In one exemplary embodiment, the receiving device continuously analyses the received video data and uses the face detection function to detect whether or not a face is present in the received video data. In another exemplary embodiment, the receiving device analyzes at predetermined intervals the received video data for detecting the face. The face detection function produces a "face" or "no face" value as output. One exemplary face detection function is available from Polar Rose, MINC, Anckargripsgatan 321119 Malmö, Sweden. Other face detection products may be used in the communication device as would be recognized by those skilled in the art. In another exemplary embodiment, the face detection function may, in addition to providing a binary output face/no face output, also produce a soft output such as a certainty factor, e.g., a percentage indicating a probability that a face is present or not. This soft output may be used in filtering the information as discussed next.

A low pass filter of the face detection information may be applied to avoid a fast toggling between a face/no face output, which may in later steps switch on/off the synchronization function too frequently, for example, in case of a moving camera relative to a face of the user. Such frequent switching would cause adverse effects to the speech quality. The filter function produces a filtered detection output with values 'face' or 'no face' that avoids the frequent switch. An advanced face detection function may produce 'soft' certainty information, including in its output a certainty value from 0 to 100% representing the certainty with which the detection algorithm could conclude whether the analyzed video data included a face or not. If the face detection function produces soft certainty information as described above, this information can be used in the filtering function, for example, if the detection certainty is low, longer filtering is applied to increase the decision basis for change of detection state between 'face' and 'no face'.

If the output value of the filtered detection is 'face', the synchronization function is applied to synchronize the audio data and video data. If the synchronization function was previously not used (i.e., OFF) the synchronization is switched ON based on the output "face." The switch-on may either be performed immediately after the output "face" is determined, which may cause a gap in the speech, or may be performed in a more advanced way that eliminates the speech gap, e.g., using time scaling (that will be discussed later) or waiting for a pause in the speech to implement the synchronization function.

If the output value of the filtered detection is "no face," no synchronization between the audio data and the video data is applied because the speech does not accompanies a lip movement. Thus, according to this exemplary embodiment, the audio data is played out upon decoding, resulting in better speech quality. In this case, if the synchronization function is ON and the output value is "no face," the synchronization function is turned OFF. The switch-off may be implemented either immediately, which may cause a clipping of an audio segment, or may be implemented in a more advanced way that eliminates the audio segment clipping, e.g., using time scaling or waiting for a pause in the audio data.

Thus, the receiving device is prepared to switch on and off the synchronization function as necessary. In the RTP/UDP/IP system using RTCP as the enabling protocol, according to one exemplary embodiment, the communication device stays prepared to switch on and off the synchronization function by monitoring and keeping track of the RTCP sender reports.

Figure 6:
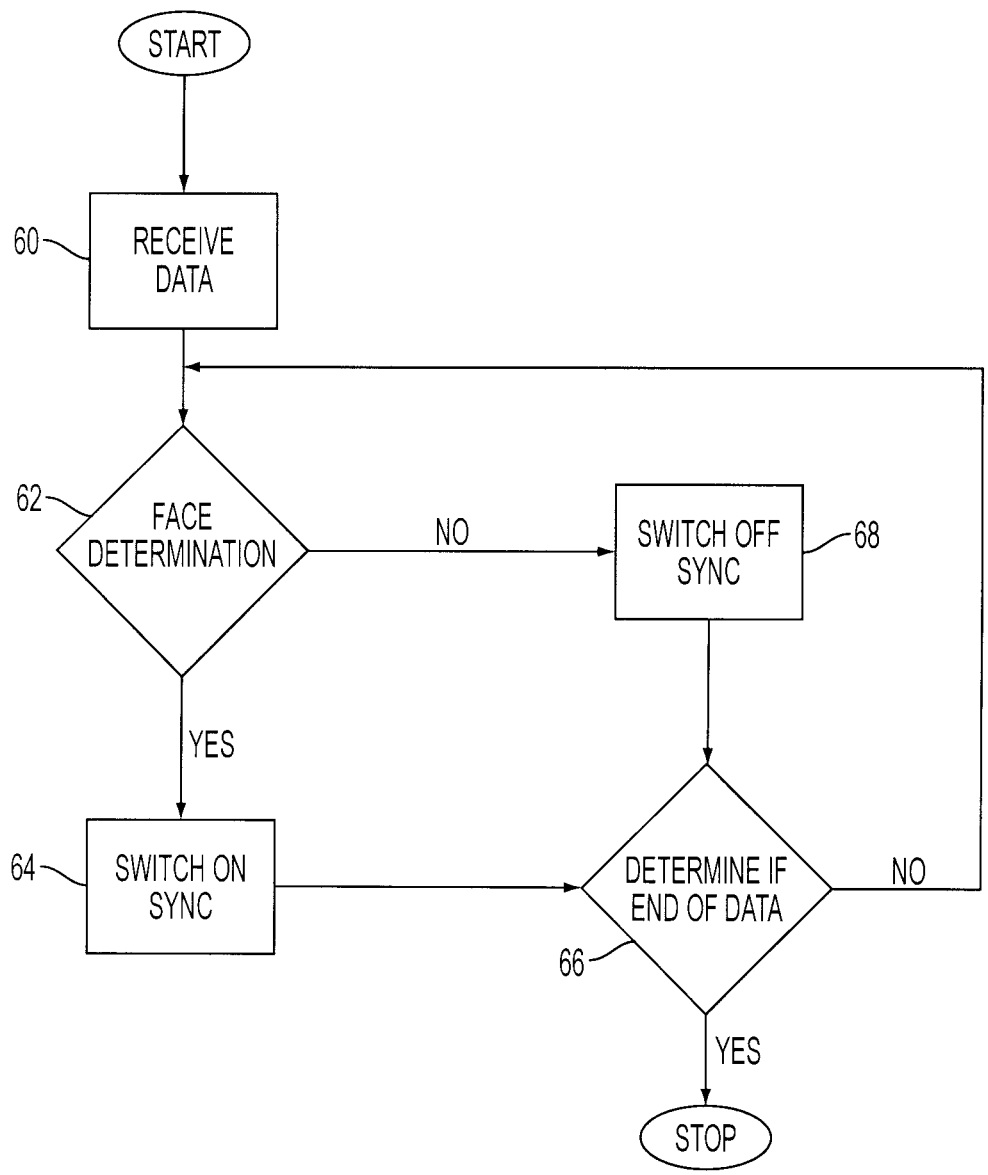
FIG. 6 is a diagram illustrating a process for switching on and off a synchronization function based on a face detection process according to an exemplary embodiment.

A process that switches on and off the synchronization function is shown in FIG. 6. Data is transmitted from a sending device to a receiving device. Thus, in step 60 the data is received at the receiving device. In step 62, the receiving device determines whether a face is present in the video data of the transmitted data. If the face is determined to be present in this step, the synchronization function is switched on in step 64 and the process advances to step 66, in which it is determined whether an end of the data is present. If the end of the transmitted data is determined, the receiving device stops the switching process. However, at step 62, if no face is determined to be present in the received data, the process advances to step 68, in which the synchronization function is switched off. Then, the process advances to step 66, which has been described above. If the end of the data is not determined, the process continues to step 62.

Figure 7:
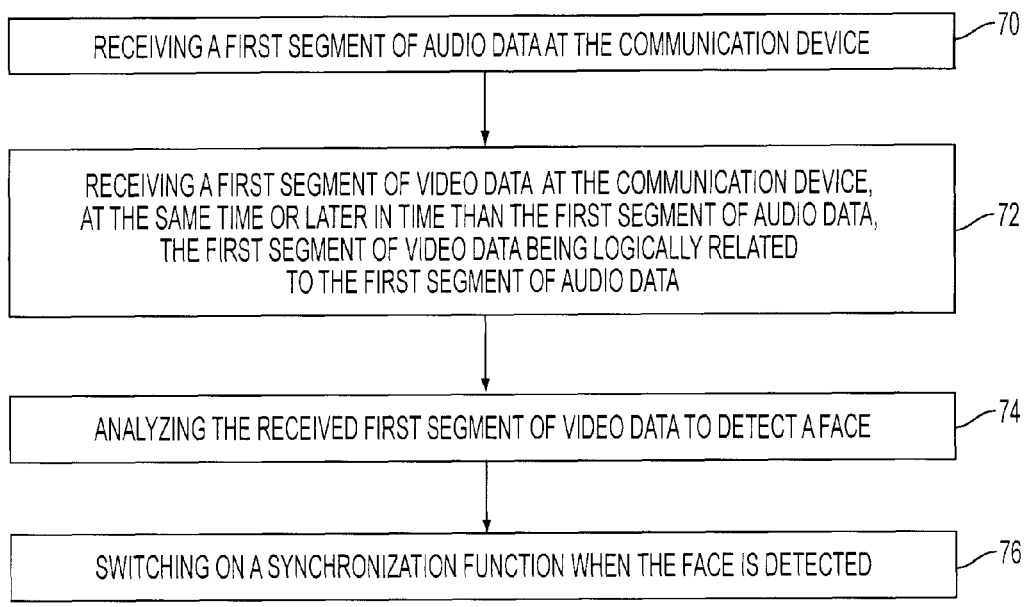
FIG. 7 is a flow chart illustrating steps for switching on and off the synchronization function based on the face detection process according to an exemplary embodiment.

An exemplary method that follows the above discussed process is shown in FIG. 7. This exemplary method is a method for synchronizing video data with audio data received by a communication device, the video data including a plurality of segments of video data and the audio data including a plurality of segments of audio data. The method includes a step 70 of receiving a first segment of audio data at the communication device, a step 72 of receiving a first segment of video data at the communication device, at the same time or later in time than the first segment of audio data, the first segment of video data being logically related to the first segment of audio data, a step 74 of analyzing the received first segment of video data to detect a face, and a step 76 of switching on a synchronization function when the face is detected.

According to another exemplary embodiment, the receiving device does not use the face recognition function to turn on and off the synchronization process. In this exemplary embodiment the user decides when to switch on and off the synchronization process. In other words, at the start of the communication between the sending device and the receiving device, no synchronization is applied at the receiving device. In this exemplary embodiment, for simplicity, the synchronization function is considered at the receiving device and not at the sending device. However, the synchronization function may be applied to any of the devices or at both of them. If the user of the receiving device receives media that needs synchronization, the user may push a soft key on the receiving device, which results in the receiving device starting to apply the synchronization, i.e., audio data delay or time scaling or other methods. Thus, the user may choose to apply or not the synchronization according to his/her preferences and the current communication situation. The synchronization function may be one discussed in the exemplary embodiments or one known by those skilled in the art. The user may also be allowed to configure default preferences of the receiving device's treatment of calls with respect to synchronization, through settings in an options menu of the device. For example, the synchronization function may be turned on by default or the synchronization function may be turned off if the video data is severely delayed.

Figure 8:
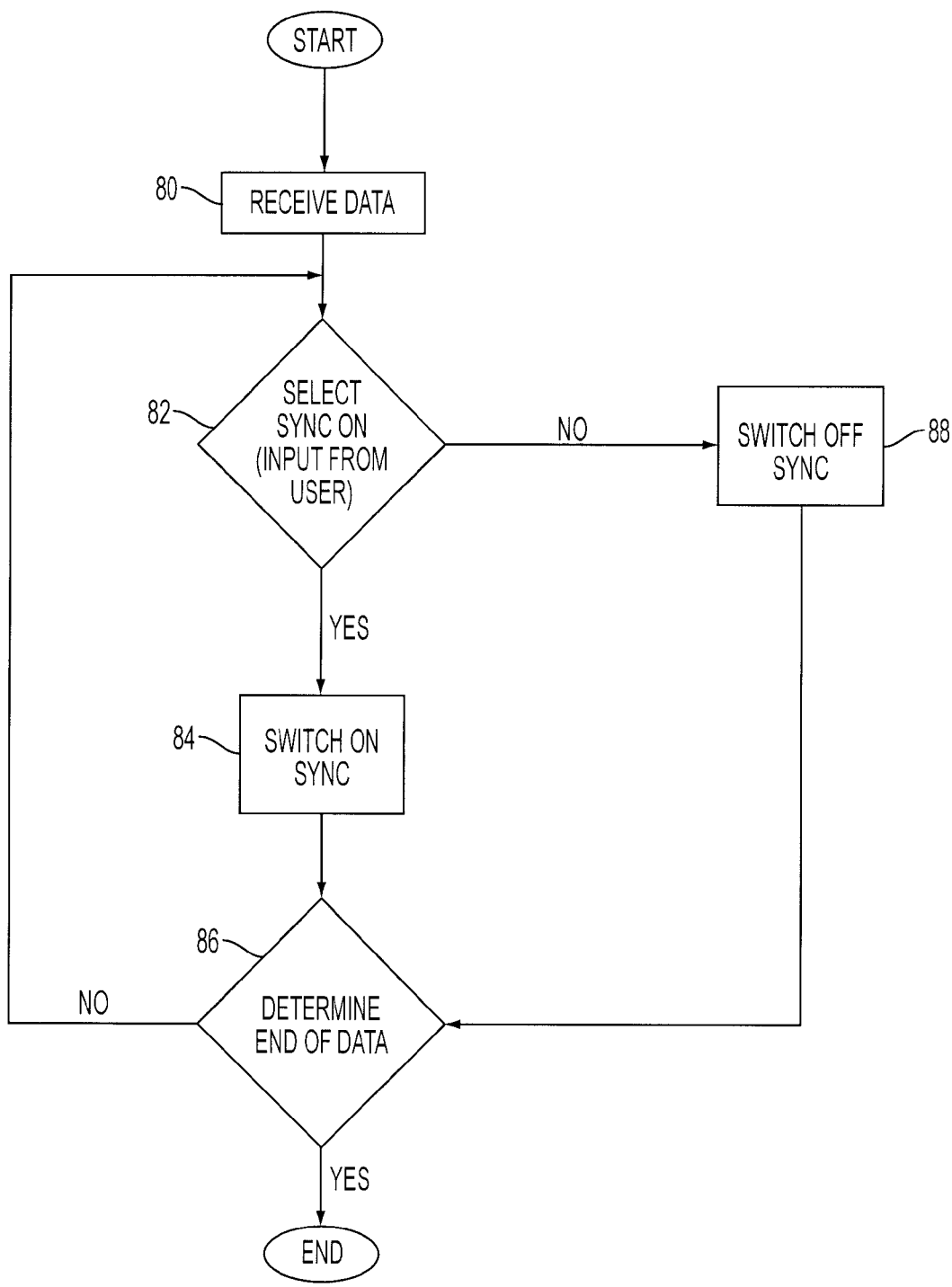
FIG. 8 is a diagram illustrating the process for switching on and off a synchronization function based on a user input according to an exemplary embodiment.

A process for applying the synchronization as discussed above is illustrated in FIG. 8. In this exemplary embodiment, the communication device of the user is configured to start with the synchronization function switched off. In another exemplary embodiment, the communication device may start with the synchronization function switched on. During the communication between the sending device and the receiving device, the sending device transmits audio and video data to the receiving device based on standard protocol tools to enable the synchronization function. The receiving device receives the data in step 80. The user may have a menu option to switch on/off the synchronization function, for example, a soft key indicating "Sync audio and video" if the synchronization function is currently switched off, and "Minimize audio delay" if the synchronization function is currently switched on. In another exemplary embodiment, the user may have a non-soft key (i.e., a dedicated hardware implemented button) on the communication device for making the above noted selection. If the user selects the "Sync audio and video" in step 82, the synchronization function is switched on in step 84. Then, the process advances to step 86, in which the communication device determines whether an end of the data has been received. If the end of the data has been received, the process is stopped. If the end of the data has not been received, the process restarts at step 82. If the user selects "Minimize audio delay" in step 82, the synchronization between the audio data and the video data is switched off in step 88 and the process advances to step 86 already described.

Figure 9:
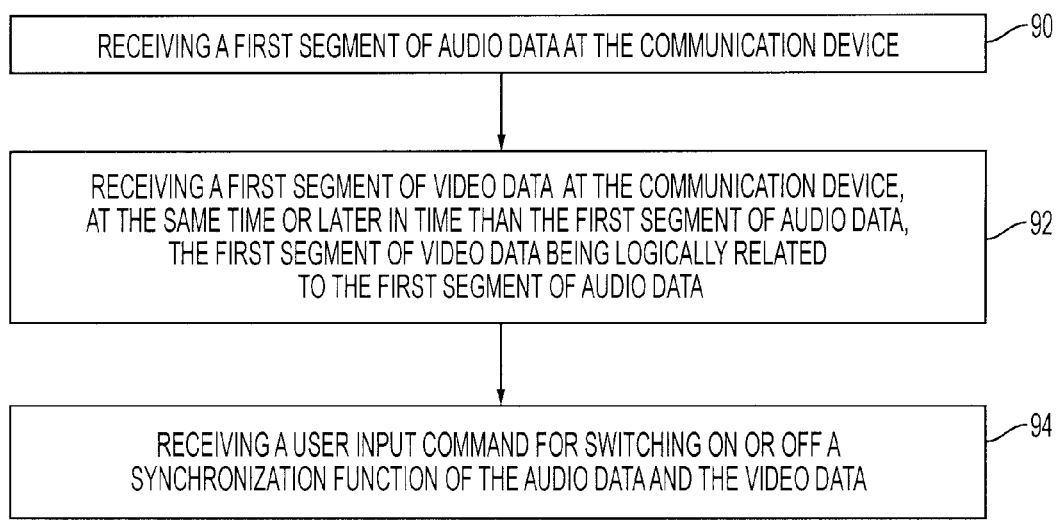
FIG. 9 is a flow chart illustrating steps for switching on and off the synchronization function based on the user input according to an exemplary embodiment.

An exemplary method that follows the above discussed process is shown in FIG. 9. This exemplary method is a method for synchronizing video data with audio data received by a communication device, the video data including a plurality of segments of video data and the audio data including a plurality of segments of audio data. The method includes a step 90 of receiving a first segment of audio data at the communication device, a step 92 of receiving a first segment of video data at the communication device, at the same time or later in time than the first segment of audio data, the first segment of video data being logically related to the first segment of audio data, and a step 94 of receiving a user input command for switching on or off a synchronization function of the audio data and the video data.

Thus, according to these exemplary embodiments, the user decides when to synchronize the audio and video data. Lip synch is used when speaker's lips are in the picture and the user desires to have the synchronization. Otherwise no synchronization is used, optimizing the speech conversational quality by minimizing the audio data delay. The exemplary embodiments may be implemented in the receiver only, thus requiring no signaling from the network or exchanging signals with the transmitting device.

According to the following exemplary embodiments, the audio data may be synchronized with the video data based on a novel approach that is described next. No pre-notification, face detection or user input is necessary for the following exemplary embodiments. A synchronization process at the start of the speech was described with reference to FIG. 3. That synchronization process is undesirable because of the large time delay of the audio data. However, according to the present novel approach, the time delay of the audio data is reduced such that the delay does not become annoying for the users of the communication system. The reduction in the time delay may be achieved, according to an exemplary embodiment, by time scaling the audio data.

More specifically, one or more segments of the audio data are played during a first part of the speech at a different speed than during a second part of the speech, which is later than the first part. The first part of the speech may include a first segment and one or more subsequent segments. In this context, the first segment, which was defined earlier in a generic manner, may be further defined, for this exemplary embodiment, as lasting from a time indicative of a beginning of a talk spurt, when less delayed audio data may be played out with a slower speed than normal, ahead of more delayed video data, until a time when the audio data catches up with the video data, i.e., the audio and video are synchronized. One way to monitor and decide when the audio and video data are synchronized is to monitor a timestamp of frames of the audio and video data. A last segment of the first part of the speech is related to an end of a talk spurt and may last between the play out time of the talk spurt and a current time, when a beginning of a silence period is detected. According to an exemplary embodiment, each part of the speech may correspond to a talk spurt.

Thus, the audio data may start with a reduced time delay and then, during the first seconds of the speech, more delay is added by time scaling segments of the audio data (audio in "slow-motion") in order to achieve the synchronization of the audio data with the video data. There are various methods for accomplishing the time scaling of the audio data, so that its perceptual quality is not degraded too much. For instance Appendix I for ITU-T's Recommendation G.711, the entire content of which is incorporated here by reference, refers to Waveform Shift Overlap Add (WSOLA), which is such a method. When the synchronization is achieved, the audio and video data is played at normal speed, until just before the end. In other words, because the audio data is played earlier than the video data and because the two types of data have the same original length, at least a first segment of the audio data may be "dilated" by playing the first segment of the audio data at a slower speed than normal. According to an exemplary embodiment, more segments (the first segment and subsequent segments of the audio data) may be played at a lower speed to achieve the synchronization between the audio data and the video data.

At the end of the audio data received from a user, the reaction delay of the other user may be reduced by using again the time scaling of the received audio data (speed up at least a last segment of the audio data, i.e., "fast-motion" of the audio data). Although the audio data is not in sync any longer with the video data, the user is able to reduce his or her reaction time and answer with a shorter delay to the other user. The scaling at the end of the speech, which is discussed in more detail later, may be implemented in a device without implementing the scaling at the beginning of the speech. However, in one exemplary embodiment, both scaling methods are implemented at least at one of the users. These novel processes may make the conversational interaction between the users better, while still achieving the synchronization of video and audio data for most of the duration of the conversation.

Figure 10:
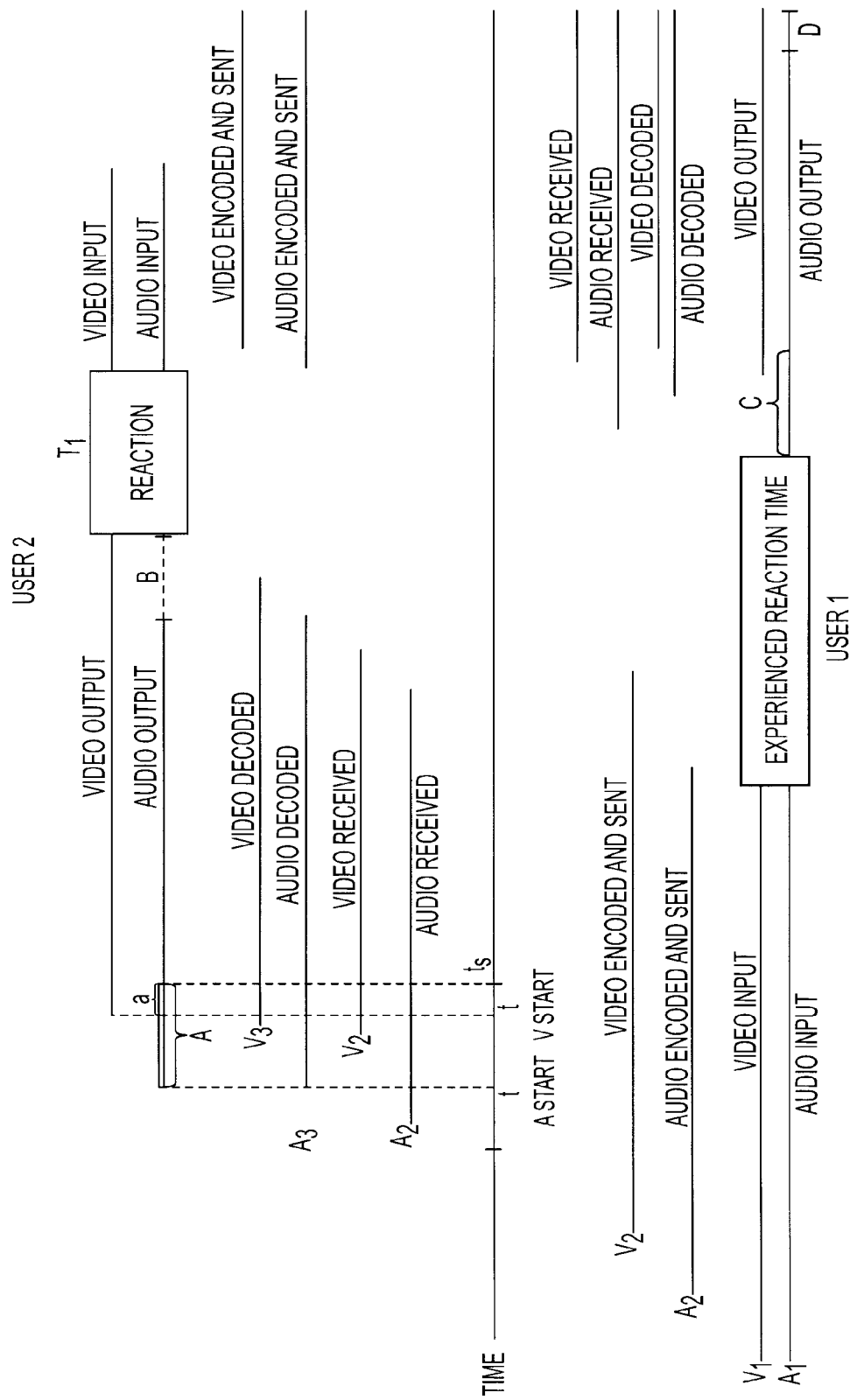
FIG. 10 a schematic diagram showing the timing of audio and video data exchanged between the sending device and the receiving device with time scaling.

According to an exemplary embodiment, FIG. 10 shows the user 1 sending audio and video data to user 2 and user 2 also sending audio and video data to user 1 in response to the received audio and video data. The input of audio data A1 and video data V1, the encoding and receiving of audio data A2 and video data V2, and the decoding of audio data A3 and video data V3 have been discussed with reference to FIG. 3. Playing the decoded audio data A3 and the decoded video data V3 is different and novel from what is shown in FIG. 3. This part is discussed next in detail with regard to FIG. 10. Instead of delaying the decoded audio data A3 until the decoded video data V3 becomes available, according to an exemplary embodiment, the decoded audio data A3 is played (reproduced) after this audio data is decoded. Thus, as shown in FIG. 10, the starting time $t_{Astart}$ of the decoded audio data A3 is earlier than the starting time $t_{Vstart}$ of the decoded video data V3. Thus, the time delay of the speech is reduced comparative to traditional delay methods. However, to achieve the synchronization between the decoded audio data A3 and the decoded video data V3, at least a first portion "A" of the audio data is played at a slower speed than a normal speed (a predetermined speed) until the decoded video data V3 becomes available. When the decoded video data V3 is available, the audio data may still be played at a slower speed in order for the video data to "catch up" with the audio data. The audio data may be played for a period "a" after the video data has started to be reproduced at time $t_{Vstart}$ at the slower speed to achieve the synchronization between the audio and video data. In one exemplary embodiment, the time period "a" has a predetermined value, for example 2 seconds. According to another exemplary embodiment, the audio and video data may be synchronized after a certain time $t_{catch-up}$ (e.g., 1 s), and "a" is defined as being $t_{catch-up}$-"A". At the end of the time period "a," the audio speed is increased to the normal speed so that at time $t_S$, the synchronization between the audio and video data is achieved. In one exemplary embodiment the audio data speed is slowly (continuously and/or monotonically) increased during the time period "a" to the normal speed. In another embodiment, the audio data speed is suddenly (step-like manner) increased from the low speed to the normal speed.

Speeding up at the end of a talk spurt requires some methods to detect in advance, when a silence period is going to start. One way could be to peek at the packet(s) at the end of the speech buffer as soon as possible in order to enable speeding up. The silence is visible with certain audio codecs (e.g., AMR) from the different size and rate of the frames during silence. In the end of the audio data, the reaction delay of the other user may be reduced by applying the time scaling to at least a last segment of the audio data (speed up the audio data, i.e., "fast-motion" of the audio data). As shown in FIG. 10, just before the end of the decoded video data V3, the reproduction speed of the audio data is increased above the normal speed in order to have the audio data A3 presented to the user earlier than the decoded video data V3. The audio data ends, in one exemplary embodiment, with a time interval B earlier that the decoded video data V3. Although the audio is not in sync any longer with the video, the user is able to reduce his or her reaction time and answer with a shorter delay T1 (shorter by B) to the other user. The scaling at the end of the speech B or D may be implemented in a device without implementing the scaling at the beginning of the speech (A or C).

User 1 may similarly start the audio sooner than without time scaling, both because user 2 started sending information earlier, and because the audio data in the communication device is started earlier. Again, the synchronization of the audio data with the video data is achieved after some time (after part C is played), since the audio data is played in the beginning with a slower speed. This approach prevents user 1 from starting to send information, e.g., to start talking while information is being received from user 2. This approach also decreases the level of disturbance, since the experienced reaction time is shorter than in conventional processes.

The end of the speech burst can be determined from the already received speech frames, e.g., when silence is detected. Based on this detection, the end of the audio data may be played at a higher speed so that the video data is played for time interval D without the audio data (as the audio data has already been played), to allow that other user to reduce her or his response time. Thus, according to these exemplary embodiments, the audio is synchronized with the video for most of the time (except, for example, for periods A, B, C, and D), with a minimum impact on the conversation quality because of the reduced delay of the speech.

Figure 11:
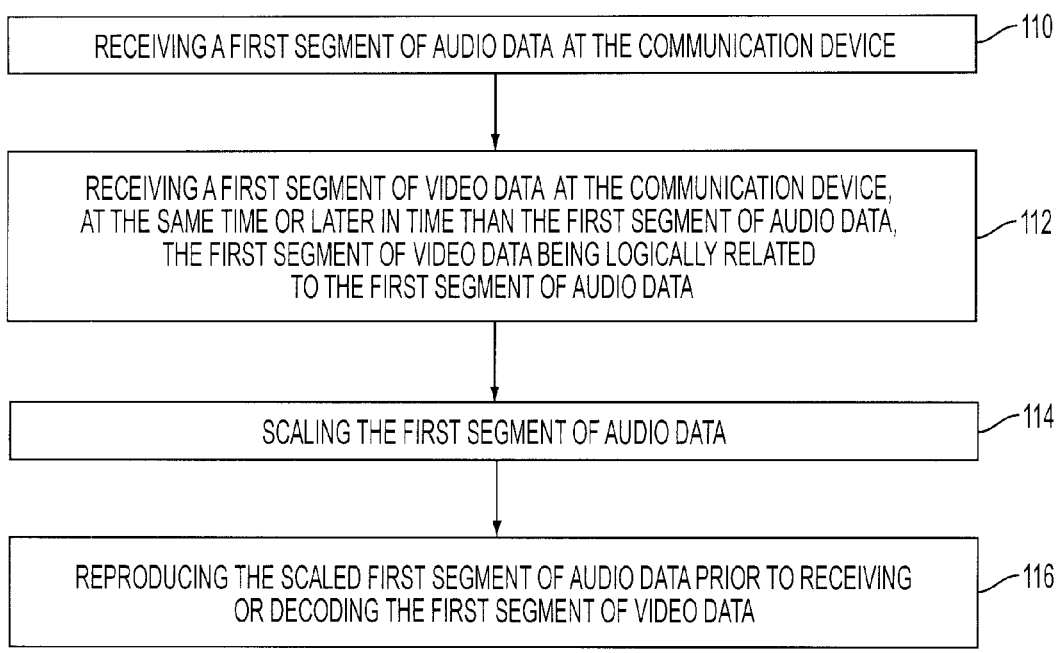
FIG. 11 is a flow chart illustrating steps for applying the time scaling to a first segment of audio data according to an exemplary embodiment.
Figure 12:
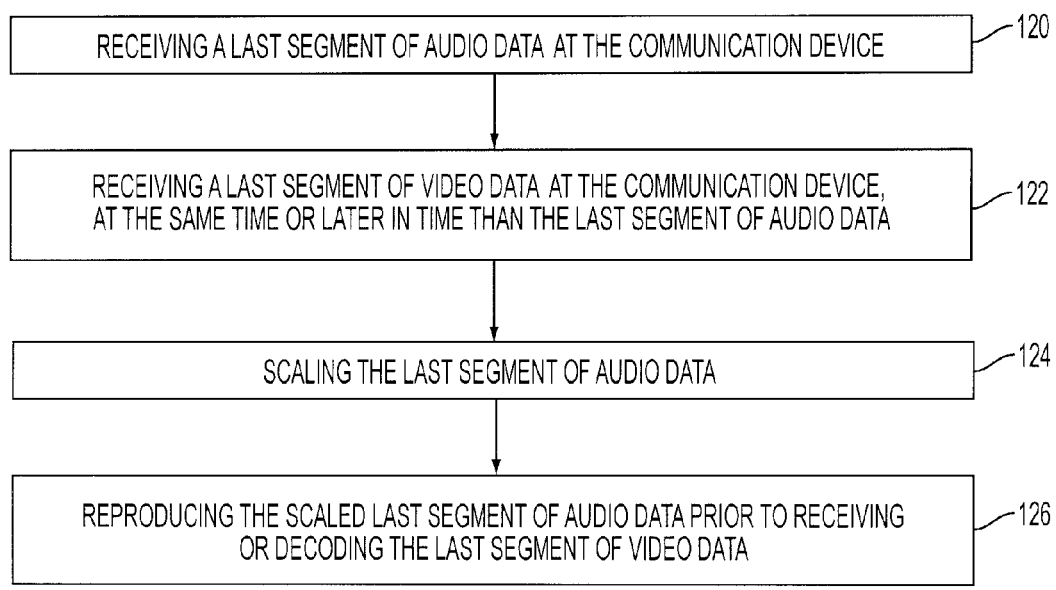
FIG. 12 is a flow chart illustrating steps for applying the time scaling to a last segment of audio data according to an exemplary embodiment.

An exemplary method that scales the first segment is shown in FIG. 11. This exemplary method is a method for synchronizing video data with audio data received by a communication device, the video data including a plurality of segments of video data and the audio data including a plurality of segments of audio data. The method includes a step 110 of receiving a first segment of audio data at the communication device, a step 112 of receiving a first segment of video data at the communication device, at the same time or later in time than the first segment of audio data, the first segment of video data being logically related to the first segment of audio data, a step 114 of scaling the first segment of audio data, and a step 116 of reproducing the scaled first segment of audio data prior to receiving or decoding the first segment of video data. Another exemplary method that scales the last segment of audio data is discussed with reference to FIG. 12. The method includes a step 120 of receiving a last segment of audio data at the communication device, a step 122 of receiving a last segment of video data at the communication device, at the same time or later in time than the last segment of audio data, a step 124 of scaling the last segment of audio data, and a step 126 of reproducing the scaled last segment of audio data prior to receiving or decoding the last segment of the video data. The steps shown in FIG. 12 may be performed in conjunction with the steps shown in FIG. 11 or may be performed independent of the steps shown in FIG. 11.

Figure 13:
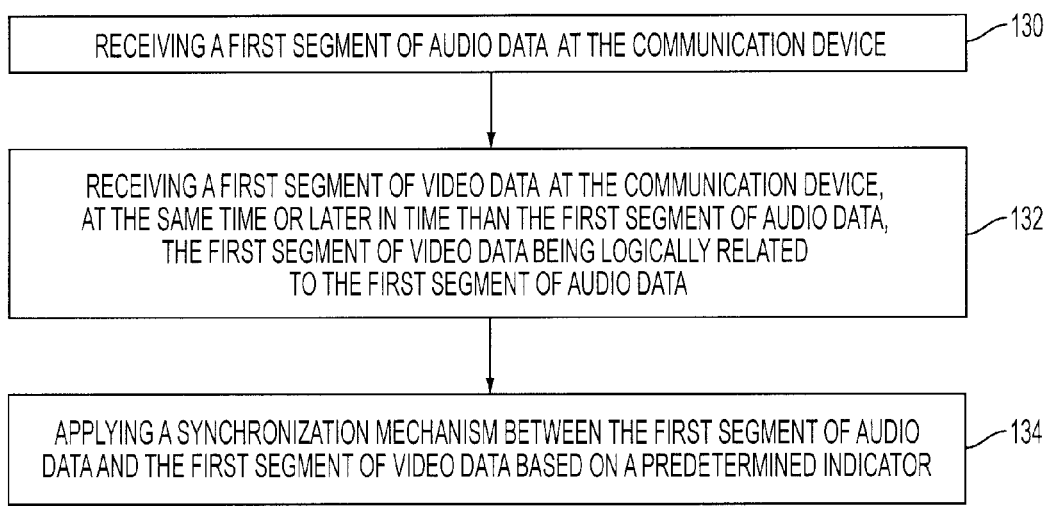
FIG. 13 is a flow chart illustrating steps of a method for synchronizing video data with audio data.

FIG. 13 is a flow chart that shows steps of a method for synchronizing video data with audio data received by a communication device, the video data including a plurality of segments of video data and the audio data including a plurality of segments of audio data. The method includes a step 130 of receiving a first segment of audio data at the communication device, a step 132 of receiving a first segment of video data at the communication device, at the same time or later in time than the first segment of audio data, the first segment of video data being logically related to the first segment of audio data, and a step 134 of applying a synchronization mechanism between the first segment of audio data and the first segment of video data based on a predetermined indicator. The synchronization mechanism may be one of the above discussed novel synchronization mechanisms.

The various exemplary embodiments have been discussed above in isolation. However, any combination of these exemplary embodiments may be used as would be appreciated by those skilled in the art.

The disclosed exemplary embodiments provide a communication device, a system, a method and a computer program product for sending audio and video data from a sending device to a receiving device and for synchronizing the audio and video data at the receiving device. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

As also will be appreciated by one skilled in the art, the exemplary embodiments may be embodied in a wireless communication device, a wired communication device, in a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer readable medium may be utilized including hard disks, CD-ROMs, digital versatile disc (DVD), optical storage devices, or magnetic storage devices such a floppy disk or magnetic tape. Other non-limiting examples of computer readable media include flash-type memories or other known memories.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a general purpose computer or a processor.

The exemplary embodiments may also be implemented in an application specific integrated circuit (ASIC), or a digital signal processor. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. A processor in association with software may be used to implement a radio frequency transceiver for use in the user terminal, the base station or any host computer. The user terminal may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method for synchronizing video data with audio data received by a communication device, the video data including a plurality of segments of video data and the audio data including a plurality of segments of audio data, the method comprising:
the communication device receiving a first segment of audio data comprising speech data corresponding to a person's vocal communication;
the communication device receiving a first segment of video data, at a same time or later in time than the first segment of audio data, the first segment of video data related to the first segment of audio data;
the communication device generating a speech pre-notification related to a beginning of the speech data included in the first segment of audio data;
the communication device displaying visual information or reproducing audio information indicative of the speech pre-notification prior to playing the beginning of the first segment of audio data; and
the communication device applying a synchronization mechanism between the first segment of audio data and the first segment of video data by using the speech pre-notification after displaying the visual information or reproducing the audio information indicative of the speech pre-notification.

2. The method of claim 1, further comprising:
the communication device generating the speech pre-notification related to an end of a last segment of audio data; and
the communication device displaying the visual information or reproducing the audio information indicative of the speech pre-notification prior to playing the end of the last segment of audio data.

3. The method of claim 1, further comprising:
the communication device displaying the visual information as a picture or a character on a screen of the communication device or as a light produced by a light source or processing the audio information to emit a sound.

4. The method of claim 1, further comprising:
the communication device analyzing the received first segment of video data to detect a presence of a face.

5. The method of claim 4, further comprising:
the communication device filtering the received first segment of video data to determine a probability of the presence of the face in the first segment of video data.

6. The method of claim 5, further comprising:
the communication device switching on the synchronization mechanism when the determined probability is larger than a predetermined threshold probability.

7. The method of claim 6, further comprising:
the communication device switching off the synchronization mechanism when a subsequent determined probability of the presence of the face in a corresponding subsequent segment of the video data is lower than a predetermined threshold probability.

8. The method of claim 1, wherein the communication device applying the synchronization mechanism comprises:
the communication device producing the beginning of the first segment of audio data prior to receiving or decoding the first segment of video data;
the communication device reproducing at least the first segment of audio data at a reproducing speed, which is lower than a predetermined speed; and
the communication device increasing the reproducing speed of the first segment or a subsequent segment of the audio data to the predetermined speed when the first segment of video data is available for reproduction.

9. The method of claim 1, further comprising:
the communication device receiving a last segment of audio data;
the communication device receiving a last segment of video data, at a same time or later in time than the last segment of audio data, the last segment of video data related to the last segment of audio data;
the communication device reproducing the last segment of audio data at a reproducing speed, which is higher than a predetermined speed such that the last segment of audio data and the last segment of video data are out of synchronism, and
the communication device ending the reproduction of the last segment of audio data prior to ending the reproduction of the last segment of video data.

10. A communication device for synchronizing received video data with received audio data, the video data including a plurality of segments of video data and the audio data including a plurality of segments of audio data, the communication device comprising:
an input/output unit configured to receive a first segment of audio data comprising speech data corresponding to a person's vocal communication and to receive a first segment of video data that is received at a same time or later in time than the first segment of audio data, the first segment of video data related to the first segment of audio data;
a processor configured to generate a speech pre-notification related to a beginning of the speech data included in the first segment of audio data;
the processor further configured to display visual information or reproduce audio information indicative of the speech pre-notification prior to playing the beginning of the first segment of audio data; and
the processor further configured to apply a synchronization mechanism between the first segment of audio data and the first segment of video data by using the speech pre-notification after displaying the visual information or reproducing the audio information indicative of the speech pre-notification.

11. The device of claim 10, wherein the processor is further configured to:
generate the speech pre-notification related to an end of a last segment of audio data; and
display the visual information or reproduce the audio information indicative of the speech pre notification prior to playing the end of the last segment of audio data.

12. The device of claim 10, further comprising:
a display unit configured to display the visual information as a picture or a character on a screen of the communication device or as a light generated by a light source; or
a sound reproducing unit configured to reproduce the audio information as a sound.

13. The device of claim 10, wherein the processor is further configured to:
analyze the received first segment of video data to detect a presence of a face.

14. The device of claim 13, wherein the processor is further configured to:
filter the received first segment of video data to determine a probability of the presence of the face in the first segment of video data.

15. The device of claim 14, wherein the processor is further configured to:
switch on the synchronization mechanism when the determined probability is larger than a predetermined threshold probability.

16. The device of claim 14, wherein the processor is further configured to:
switch off the synchronization mechanism when a subsequent determined probability of the presence of the face in a corresponding subsequent segment of the video data is lower than the predetermined threshold probability.

17. The device of claim 10, wherein the processor is further configured to:
reproduce at least the first segment of audio data prior to receiving or decoding the first segment of video data;
reproduce the first segment of audio data at a reproducing speed, which is lower than a predetermined speed; and
increase the reproducing speed of the first segment or a subsequent segment of the audio data to the predetermined speed when the first segment of video data is available for reproduction.

18. The device of claim 10, wherein
the input/output unit is further configured to receive a last segment of audio data and to receive a last segment of video data, at a same time or later in time than the last segment of audio data, the last segment of video data related to the last segment of audio data;
the processor is further configured to reproduce the last segment of audio data at a reproducing speed, which is higher than a predetermined speed such that the last segment of audio data and the last segment of video data are out of synchronism; and
the processor is further configured to end the reproduction of the audio data prior to ending the reproduction of the video data.

19. The method of claim 1, wherein the beginning of the first segment of audio data includes a starting point of the first segment of audio data.

20. The method of claim 1, wherein the received first segment of audio data and first segment of video data is associated with a video telephony session.

21. The method of claim 1, further comprising:
the communication device switch on the synchronization mechanism in response to detection of a face in the received first segment of video data.

22. The method of claim 1, wherein the speech pre-notification is generated by the communication device.

23. The method of claim 1, wherein the speech pre-notification is received by the communication device.

* * * * *